(12) United States Patent
Pacyga

(10) Patent No.: US 11,872,480 B2
(45) Date of Patent: *Jan. 16, 2024

(54) SYSTEM AND METHOD FOR ALTERING PERCEPTION OF VIRTUAL CONTENT IN A VIRTUAL SPACE

(71) Applicant: Electronic Arts Inc., Redwood City, CA (US)

(72) Inventor: Nathan Pacyga, Lafayette, CA (US)

(73) Assignee: Electronic Arts Inc., Redwood City, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/379,727

(22) Filed: Jul. 19, 2021

(65) Prior Publication Data

US 2022/0040568 A1 Feb. 10, 2022

Related U.S. Application Data

(63) Continuation of application No. 16/716,287, filed on Dec. 16, 2019, now Pat. No. 11,065,536, which is a (Continued)

(51) Int. Cl.
*G09G 5/00* (2006.01)
*A63F 13/25* (2014.01)

(52) U.S. Cl.
CPC ............... *A63F 13/25* (2014.09); *G09G 5/00* (2013.01); *A63F 2300/609* (2013.01);
(Continued)

(58) Field of Classification Search
CPC .... G09G 5/00; G09G 2340/14; A63F 2300/66
See application file for complete search history.

(56) References Cited

U.S. PATENT DOCUMENTS 8,271,475 B2 9/2012 Hamilton, II et al.
8,435,121 B1 5/2013 Fisher et al.
(Continued)

OTHER PUBLICATIONS

Chaoren , "Customize your UI in WoW", downloaded @ https://www.youtube.com/watch?v=LJOK0NuNYhU, posted by Chaoren the Insane on Oct. 8, 2012 (Year: 2012).*
(Continued)

*Primary Examiner* — Samantha (Yuehan) Wang
(74) *Attorney, Agent, or Firm* — Knobbe, Martens, Olson & Bear, LLP

(57) ABSTRACT

The disclosure relates to systems and methods for altering perception of virtual or game content in a virtual space based on one or more attribute levels. The perception of some virtual or game content may not be altered. Thus, the depiction of some content is altered while other content is not. A system may alter the depiction of game content based on attributes of an entity and/or based on which entity is to perceive the game content. The different depictions of game content may be provided to the same entity at different times and/or different perceptions of game content may be provided to different entities. Thus, a rich interface may be provided that differentially depicts game content based on attribute levels and/or the entity that is to perceive the game content.

20 Claims, 6 Drawing Sheets

Related U.S. Application Data continuation of application No. 14/919,546, filed on Oct. 21, 2015, now Pat. No. 10,507,388, which is a continuation of application No. 13/715,818, filed on Dec. 14, 2012, now Pat. No. 9,186,576.

(52) U.S. Cl.
CPC ....... *A63F 2300/65* (2013.01); *A63F 2300/66* (2013.01); *G09G 2340/14* (2013.01)

(56) References Cited

U.S. PATENT DOCUMENTS

| | | | | |
|---|---|---|---|---|
| 9,186,576 | B1* | 11/2015 | Pacyga | G09G 5/00 |
| 10,507,388 | B2* | 12/2019 | Pacyga | G09G 5/00 |
| 11,065,536 | B2* | 7/2021 | Pacyga | A63F 13/25 |
| 2009/0210301 | A1 | 8/2009 | Porter et al. | |
| 2009/0299960 | A1 | 12/2009 | Lineberger | |
| 2012/0079121 | A1 | 3/2012 | Rapo et al. | |
| 2012/0290950 | A1* | 11/2012 | Rapaport | H04L 67/306 |
| | | | | 715/753 |
| 2012/0302349 | A1* | 11/2012 | Marks | A63F 13/219 |
| | | | | 345/158 |
| 2013/0328927 | A1* | 12/2013 | Mount | A63F 13/25 |
| | | | | 345/633 |

OTHER PUBLICATIONS

Chaoren, "Customize your UI in WoW", downloaded@https://www.youtube.com/watch?v=LJOKONuNYhU, posted by Chaoren the Insane on Oct. 8, 2012 (Year: 2012).

CountBleck2009, Legend of Zelda Ocarina of Time Cutscene: Getting the Master Sword, YouTube Screen Shots, https://www.you tu be. com/watch ?v=L I b mCd-G Pfw.

Macro, "What is a good Addon to move my Health Bar?", downloaded @ https://www.engadget.com/2012/04/07/roleplaying-addons-for-the-beginner-myroleplay/ on Apr. 7, 2012 (Year: 2012).

"Phasing is the new instancing," downloaded from https://www.engadget.com/2008/08/25/phasing-is-the-new-instancing/, Aug. 25, 2008, 2 pages.

Rogue, "Good addon to track Energy", downloaded @https://eu.battle.net/forums/en/wow/topic/1874247985 on Mar. 17, 2011 (Year: 2011).

Stickney, "Roleplaying addons for the beginner: MyRoleplay", downloaded @https://www.engadget.com/2012/04/07/roleplaying-addons-for-the-beginner-myroleplay/ on Apr. 7, 2012 (Year: 2012).

Timeline, "Is there a timeline addon that tells you when?", downloaded@https://us.battle.net/forums/en/wow/topic/3754945780 posted on Dec. 15, 2011 (Year: 2011).

Waugh, "Record-breaking Star Wars epic is first to beat World Of Warcraft at its own game", updated online @Dec. 28, 2011 downloaded @ https://www.dailymail.co.uk/sciencetech/article-2079294/ Record-breaking-Star-Wars-epic-be (Year: 2011).

World of Warcraft, dowloaded@https://en.wikipedia.org/w/index.php?title=World_of_Warcraft&oldid=527286053, published on Dec. 10, 2012 (Year: 2012).

"Wrath Retrospective: Lore and the art of storytelling," downloaded from https://www.engadget.com/2010/06/10/wrath-retrospective-lore-and-the-art-of-storytelling/, Jun. 10, 2010, 5 pages.

* cited by examiner

SYSTEM AND METHOD FOR ALTERING PERCEPTION OF VIRTUAL CONTENT IN A VIRTUAL SPACE

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

FIELD OF THE INVENTION

The disclosure relates to systems and methods for altering perception of virtual or game content in a virtual space based on one or more attribute levels of attributes.

BACKGROUND OF THE INVENTION

Video games and other applications that display a virtual space for interaction typically depict virtual or game content in a manner that one or more users perceive the game content in the same way. For example, game content such as a virtual building may be rendered using particular artwork (e.g., graphical image) that is presented to the user or different users. Thus, the user or different users may perceive the virtual building in the same manner, regardless of who perceives or interacts with the virtual building and regardless of the attribute levels of a user.

Differentially depicting certain game content may provide a richer interface environment that can be tailored to particular users and/or attribute levels of a user.

SUMMARY OF THE INVENTION

The disclosure relates to systems and methods for altering perception of virtual or game content (referred to hereinafter as "game content") in a virtual space based on one or more attribute levels. A system may alter the perception of game content based on attributes of an entity and/or based on which entity is to perceive the game content.

In some embodiments, the system may alter the perception of first game content but not alter the perception of second game content. For example, first game content when expressed may depict a virtual object that is in the background. The second game content when expressed may depict a virtual object that is, for example, in the foreground. An entity such as a virtual character having a particular attribute level such as a virtual age may be provided with a perception of the second game content that changes as the virtual character ages and a perception of the first game content that does not change as the virtual character ages. For example, game content such as an object may appear larger to a young character but appear smaller as the character ages.

Similarly, a first entity may be provided with a depiction of the second content and a second entity may be provided with a different depiction of the second content. The first entity and the second entity may be provided with the same depiction of the first content. The first and second entities may therefore be provided with different depictions of the second content and therefore perceive the second content differently but perceive the first content similarly.

In this manner, different depictions of game content may be provided to the same entity at different times and/or different perceptions of game content may be provided to different entities. Thus, a rich interface may be provided that differentially depicts game content based on attribute levels and/or the entity that is to perceive the game content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The disclosure relates to systems and methods for altering perception of game content in a virtual space based on one or more attribute levels.

Figure 1:
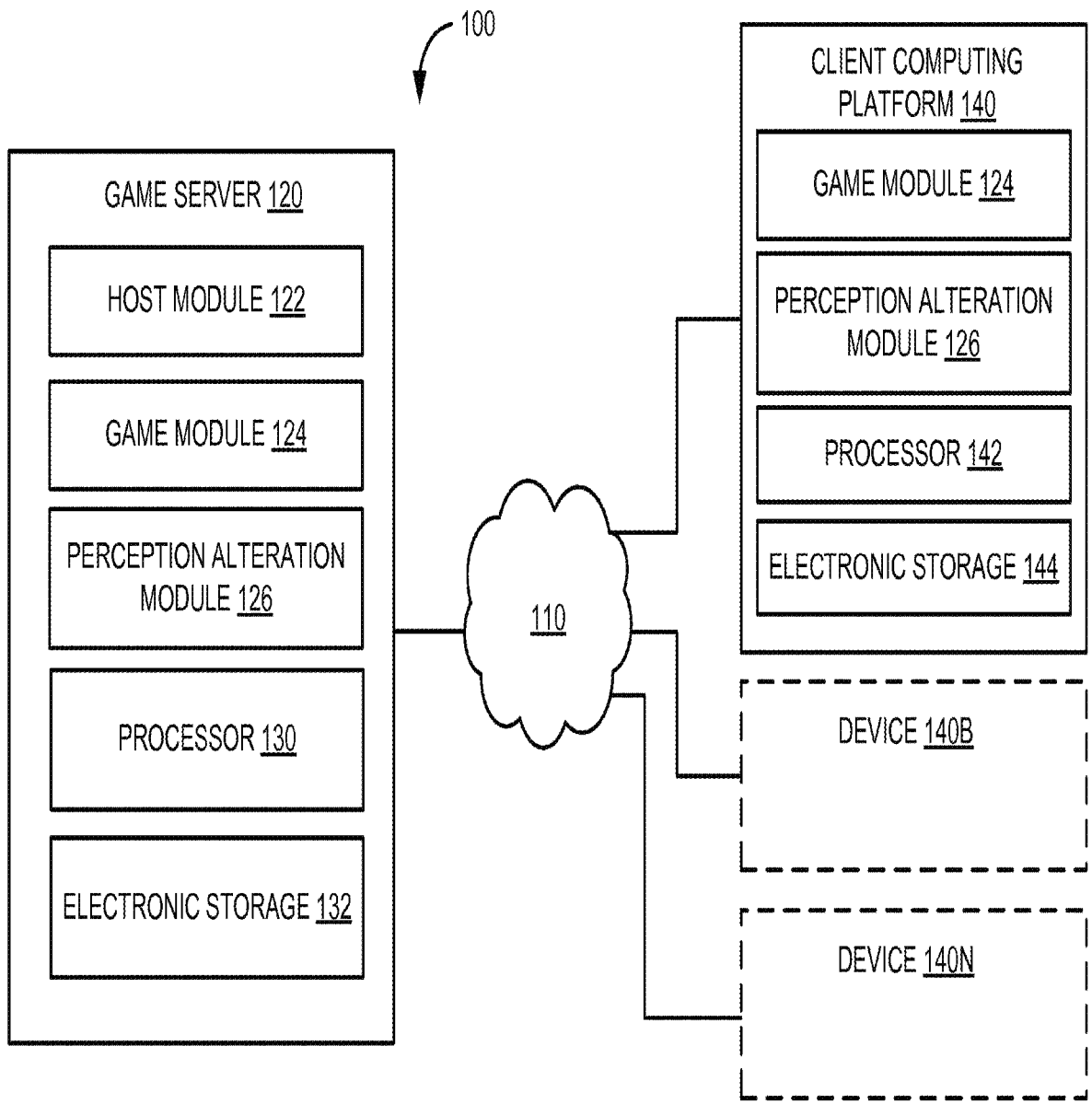
FIG. 1 illustrates a system of altering perception of game content in a virtual space, according to an embodiment of the invention.

FIG. 1 illustrates a system 100 of altering perception of game content in a virtual space, according to an embodiment of the invention. System 100 may alter the perception of game content based on attributes of an entity and/or based on which entity is to perceive the game content. Game content may include one or more expressions of a data object. For example, game content may include a graphical object depicted in a game space, a sound, a logic, and/or other content that maybe expressed in a game space.

The entity may include a virtual entity such as a character or avatar in a virtual space, a physical entity such as an actual user, and/or other entities that may have one or more attributes. An attribute may describe or characterize the entity and/or game element. For example, an attribute may include a skill, a health, an experience, a demographic such as age, a level, a skill tree, a faction, an alliance or other relationship, a time spent logged in, a time since character or account creation, and/or other attributes. Attribute levels may include values of attributes such as a skill level, a condition of health, a particular age, and/or other values of attributes. The attributes may relate to virtual entities (e.g., a virtual age of a character in the video game), physical entities (e.g., an actual age of a user), and/or other entities that may be described by attributes.

Perception of the game content may include a visual perception (e.g., the look or visual appearance of game content), an audible perception (e.g., the sound or audible characteristic of game content), a mechanical perception (e.g., the types of interactions with or logic related to the game content), and/or other ways in which the game content may be perceived.

The game content may be depicted in a manner that alters the perception of such content. For example, the visual, audible, mechanical, and/or other depictions of the game content may be altered based on an attribute level and/or who is to perceive the game content. The visual depictions that may be altered may include a size, a shape, a color, a pattern, artwork, and/or other visual depictions. The audible depictions that may be altered may include an intensity of sound, a frequency of sound, a pattern of sound, and/or other audible depictions. The mechanical depictions that may be altered may include a behavior of game content, interactions with game content, and/or other mechanical depictions.

System 100 may include a game server 120, one or more client computing platforms 140 (illustrated as client computing platform 140A, 140B, . . . , 140N), and/or other components. System 100 may alter the perception of game content based on various configurations such as a hosted, a standalone, a hybrid, and/or other configurations.

A hosted gameplay configuration may be used in which game server 120 hosts a game and communicates depictions of game content to one or more client computing platforms 140. A standalone configuration may be used in which a client computing platform 140 is configured to locally provide depictions of game content. A hybrid configuration may be used in which the depictions may be communicated from the game server 120 and/or determined locally by client computing platform 140.

Game server 120 may include one or more processors 130 configured to execute one or more modules such as a host module 122, a game module 124, a data modal substitution module 126, and/or other modules.

Host module 122 may be configured to host gameplay over network 110 such as the Internet in an interactive manner with one or more client computing platforms 140. In some embodiments, game server 120 may provide game module 124 for execution at client computing platform 140. Game module 124 when executed at the client computing platform 140 causes the client computing platform to generate an expression of the game. In hosted gameplay embodiments, game module 124 when executed at the client computing platform 140 causes the client computing platform to communicate with host module 122.

For example, host module 122 may communicate with the one or more client computing platforms via game module 124 executing at the client computing platforms 140. In particular, host module 122 may receive information related to gameplay from the client computing platforms 140. The information related to gameplay may include game inputs from a user, game status, game level, game events, and/or other information related to gameplay.

In some embodiments, game module 124 may include instructions that specify game content to be expressed in relation to a game space. For example, the game content may be visually depicted, audibly depicted, mechanically depicted (e.g., logic controlling a storyline or a behavior of other game content), and/or otherwise rendered in relation to the game space.

In a non-limiting example, game module 124 may be configured as an ADOBE FLASH file that executes via a plug-in installed at a browser of client computing platform. The ADOBE FLASH file includes instructions that when expressed causes a FLASH-based game to be playable at client computing platform 140.

In some embodiments, perception alteration module 126 may be configured to provide the depictions of the game content such that the game content is perceived based on the provided depictions. For example, perception alteration module 126 may be included or executed in association with game module 124 to depict the game content so that it is perceived in a certain way.

In some embodiments, perception alteration module 126 may be configured to obtain an attribute level of an attribute. In some embodiments, electronic storage media (132, 144) may be configured to store one or more attribute levels related to the game and/or virtual space such as an attribute level of an entity. In this manner, the attribute levels may be stored and retrieved from such storage media. In some embodiments, the attribute levels may be generated by the game module such that the attribute levels may be obtained from the game module.

The attribute level may be related to an entity such as a particular age of the entity. Perception alteration module 126 may determine a depiction of game content based on the attribute level. For example, a size, shape, sound, behavior, and/or other type of depiction for the game content may be determined based on the attribute level.

In some embodiments, perception alteration module 126 may determine a depiction to use based on one or more predefined rules or other predefined information. For example, and without limitation, the predefined information may specify different depictions corresponding to different ages such that as an entity ages, the depiction of the game content changes based on the age of the entity.

In some embodiments, perception alteration module 126 may determine a depiction to use as a function of the attribute level. For example, as the entity ages, the depicted size or other quantifiable depiction of game content may be altered. In a particular example, the depicted size of the game content may get smaller as the entity ages to simulate different perspectives as an entity ages.

Perception alteration module 126 is not limited to determining a single type of depiction based on an attribute level for an attribute. For example, a combination of different depictions (e.g., the look, sound, behavior, and/or other types of depictions) may be determined based on an attribute level for the attribute. Likewise, perception alteration module 126 is not limited to determining a depiction based on a single attribute. For example, a depiction based on a combination of more than one attribute such as by determining a depiction based on an age, a sex, a skill level, and/or other attributes may be determined. Similarly, perception alteration module 126 may determine a combination of different depictions based on a combination of attributes.

In some embodiments, perception alteration module 126 may be configured to alter the depiction of some game content but not others. For example, game content that is in the foreground, focused, or otherwise being interacted with may be depicted differently based on an attribute level while other game content that is in the background, not focused, or not interacted with may be depicted the same way irrespective of the attribute level. Thus, the depiction of a first game content may be altered based on an attribute level while the depiction of a second game content may be unaffected by the attribute level.

In some embodiments, perception alteration module 126 may be configured to alter the depiction based on an entity that is to perceive the game content. For example, a first entity may be provided with a depiction of game content while a second entity may be provided with a different depiction of the game content. Some game content may be depicted differently for different entities while other game content maybe depicted the same for different entities. In some embodiments, game content may be depicted differently to different entities based on one or more of their respective attribute levels of attributes.

Client computing platform 140 may include one or more processors 142 configured to execute one or more modules such as a game module 124, perception alteration module 126, and/or other modules.

In hosted embodiments, client computing platform 140 may receive depictions of game content from game server 120 and/or may locally determine such depictions based on perception alteration module 126 (as described above with respect to game server 120) executing locally.

In non-hosted embodiments, client computing platform 140 may locally determine depictions based on perception alteration module 126 (as described above with respect to game server 120) executing locally.

Client computing platform 140 may communicate with game server 120 via network 110. Network 110 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Those having skill in the art will recognize that game server 120 and gaming device 140 may each comprise one or more processors (130, 142), one or more interfaces (to various peripheral devices or components), electronic storage media (132, 144), and/or other components coupled via a bus. The electronic storage media may comprise random access memory (RAM), read only memory (ROM), or other memory. The memory may store computer-executable instructions to be executed by the processor as well as data that may be manipulated by the processor. The storage media may comprise floppy disks, hard disks, optical disks, tapes, or other storage media for storing computer-executable instructions and/or data.

Figure 2A:
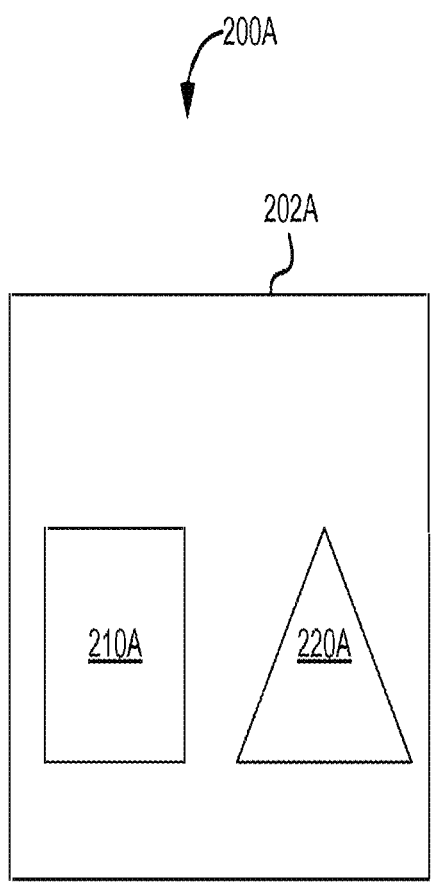
FIG. 2A illustrates a schematic diagram of a first depiction of first game content and a first depiction of second game content rendered in a virtual space, according to an embodiment.

FIG. 2A illustrates a schematic diagram 200A of a first depiction of first game content 210A and a first depiction of second game content 220A expressed in a virtual space 202A, according to an embodiment. In some embodiments, the first depiction of the first game content 210A may be independent of (e.g., not based on) an attribute level and/or who is to perceive the first game content. On the other hand, the first depiction of the second game content 220A may be based on the attribute level such that it may be altered (e.g., depicted differently) when the attribute level changes.

Figure 2B:
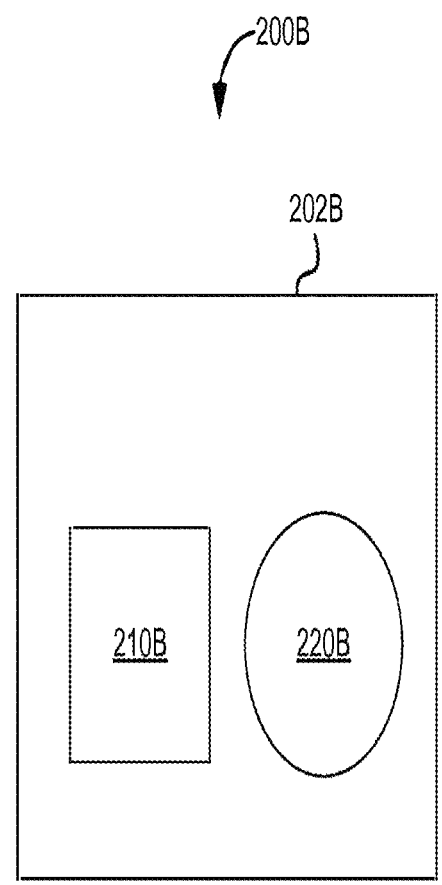
FIG. 2B illustrates a schematic diagram of a second depiction of first game content and a second depiction of second game content rendered in a virtual space, according to an embodiment.

FIG. 2B illustrates a schematic diagram 200B of a second depiction of first game content 210B and a second depiction of second game content 220B expressed in a virtual space 202B, according to an embodiment. In some embodiments, the second depiction of the first game content 210B may be independent of (e.g., not based on) an attribute level. On the other hand, the second depiction of the second game content 220B may be based on the attribute level such that it may be altered when the attribute level changes.

Referring to FIGS. 2A and 2B, the first depiction of the first game content 210A and the second depiction of the second game content 210B are the same. However, the first depiction of the second game content 220A and the second depiction of the second game content 220B are different. The different depictions may be different visual, audible, mechanic, and/or other types of depictions. The different depictions may be based various factors, non-limiting examples of which are illustrated with respect to FIGS. 3-5.

Figure 3:
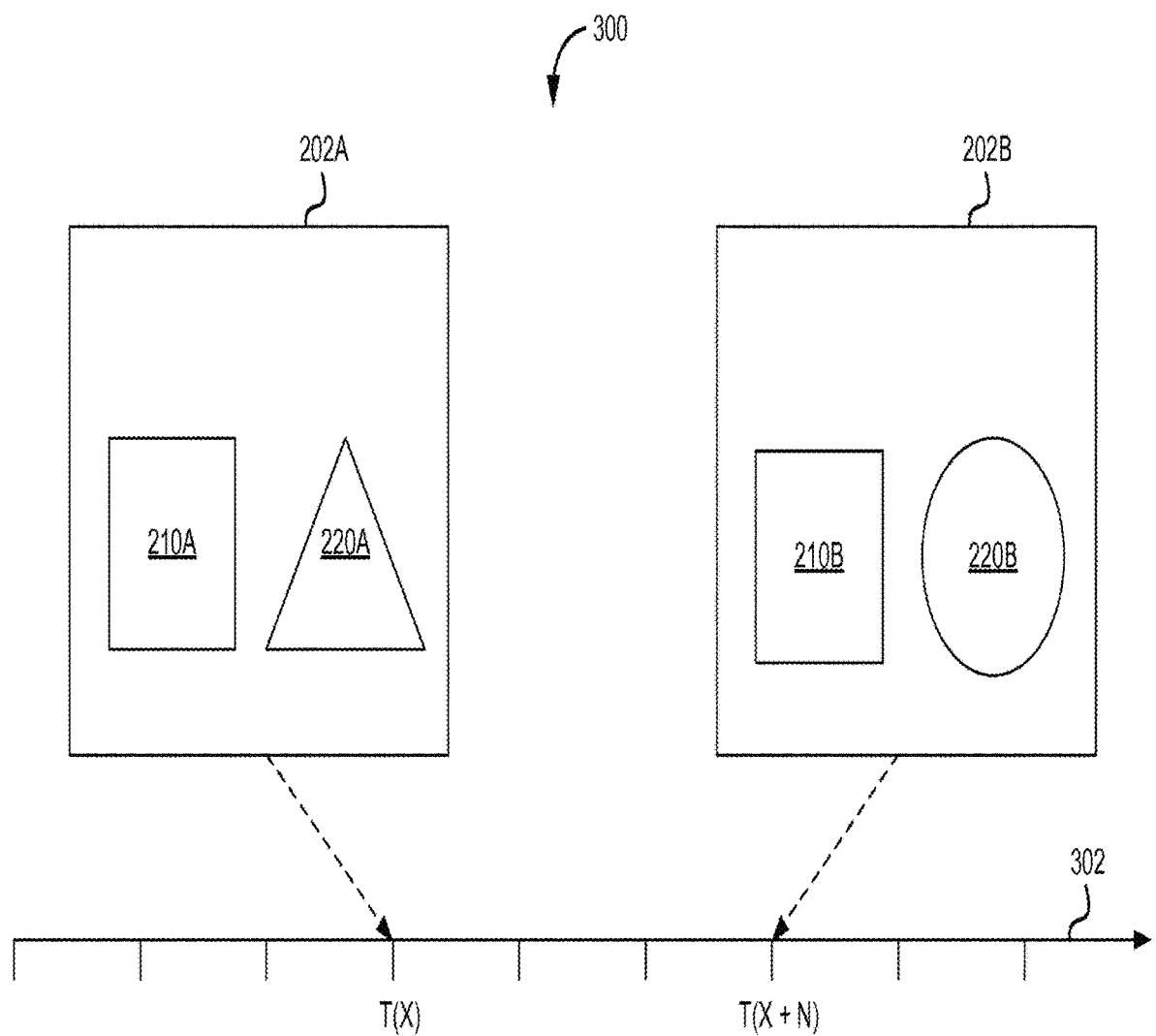
FIG. 3 illustrates a schematic diagram of a first depiction of first and second game content and a second depiction of the first and second game content along a timeline, according to an embodiment.

FIG. 3 illustrates a schematic diagram 300 of a first depiction of first and second game content 210A, 220A and a second depiction of the first and second game content 210B, 220B along a timeline 302, according to an embodiment. The various depictions may be expressed in virtual spaces 202A, 202B. Timeline 302 may include a virtual timeline (e.g., a timeline related to time in a virtual space), an actual timeline (e.g., a timeline related to time in a physical space), and/or other timelines.

A first depiction of the first game content 210A and a first depiction of the second game content 220A may be expressed in a game space 202A at a first time point, illustrated as T(X). A second depiction of the first game content 210B and a second depiction of the second game content 220B may be expressed in a game space 202B at a second time point, illustrated as T(X+N).

As illustrated, the depiction of the second game content at time T(X) is different than the depiction at time T(X+N). An entity may perceive the second content differently at time T(X) than at time T(X+N). The difference may be attributable to various reasons. For example, in some embodiments, the depiction of the second game content may simply change as time progresses. In some embodiments, the depiction of the second game content may change based on an attribute level of one or more entities changing over time.

Figure 4:
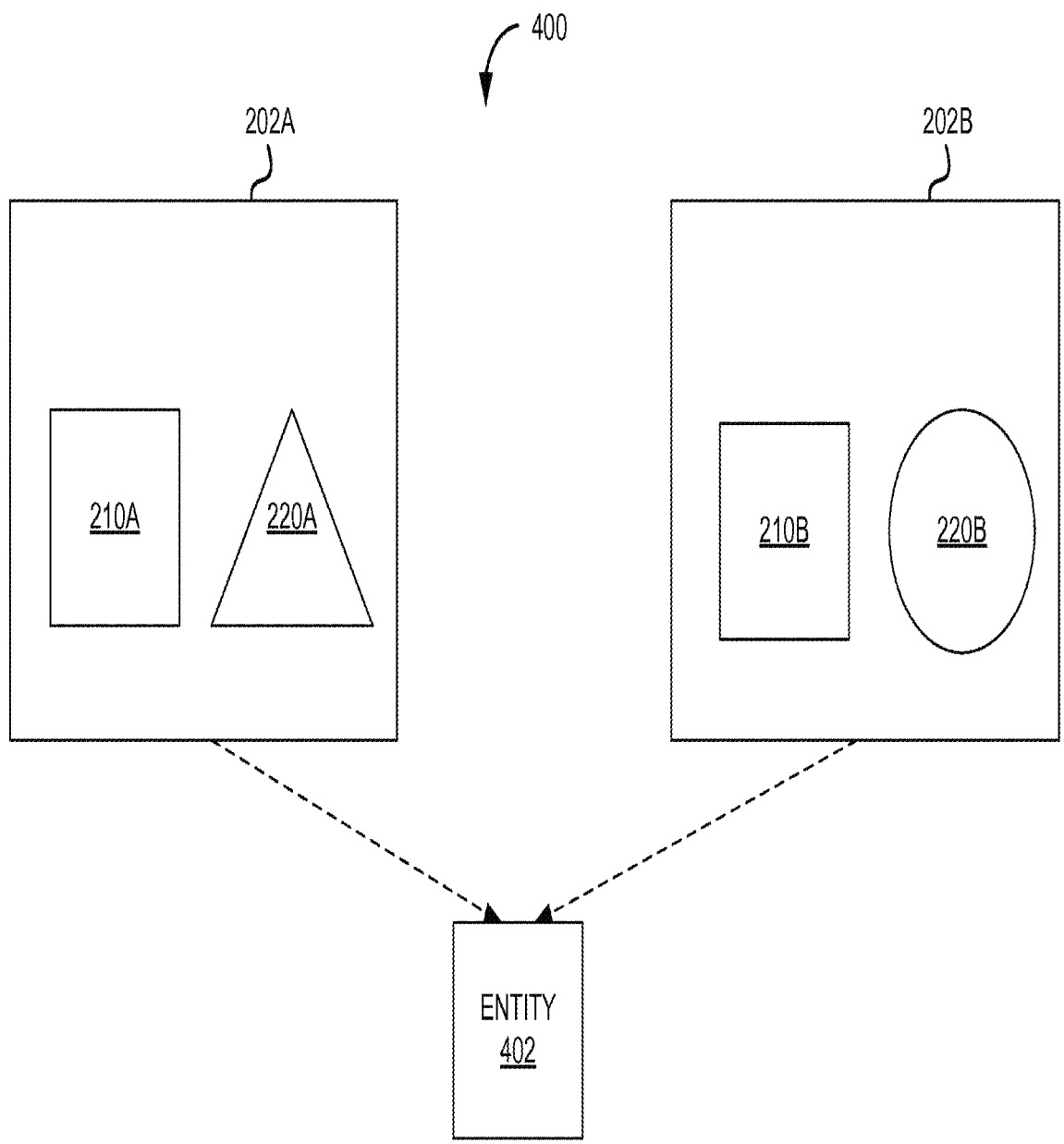
FIG. 4 illustrates a schematic diagram of a first depiction of first and second game content and a second depiction of the first and second game content as perceived by a single entity, according to an embodiment.

FIG. 4 illustrates a schematic diagram 400 of a first depiction of first and second game content (210A, 220A) and a second depiction of the first and second game content (210B, 220B) as perceived by a single entity 402, according to an embodiment. In some embodiments, as illustrated in FIG. 4, a single entity 402 may perceive the second game content differently based on an attribute level of an attribute related to the single entity 402. For example, the first perception of the second game content 220A may be based on a first attribute level of an attribute. The second perception of the second game content 220B may be based on a second attribute level of the attribute. The change in the attribute level of the attribute may cause a change in the way that the second game content is depicted and therefore a change in the perception of the second game content.

Figure 5:
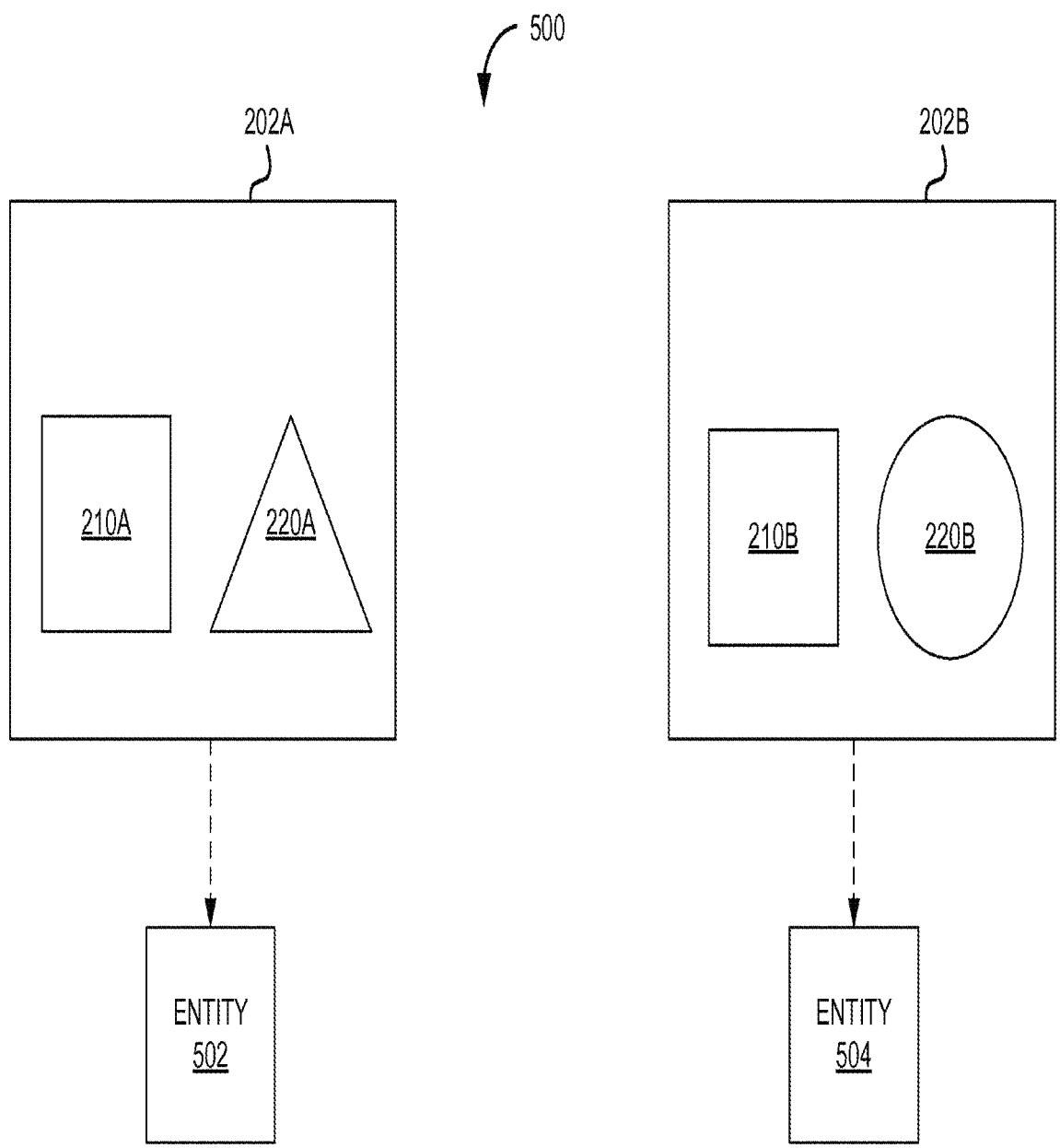
FIG. 5 illustrates a schematic diagram of a first depiction of first and second game content and a second depiction of the first and second game content as perceived by different entities, according to an embodiment.

FIG. 5 illustrates a schematic diagram 500 of a first depiction of first and second game content (210A, 220A) and a second depiction of the first and second game content (210B, 220B) as perceived by different entities 502, 504, according to an embodiment. Different depictions of the second content may be provided to and/or in relation with different entities. For example, entity 502 may be provided with a first depiction of second game content 220A and entity 504 may be provided with a second depiction of second game content 220B, thereby causing the different entities to have different perceptions of the second game content. Both entities may be provided with the same depiction of the first game content, thereby causing the different entities to have the same perception of the first game content.

The different depictions may be provided to the different entities for various reasons. For example, the different depictions may be provided merely because they are different entities. In some embodiments, the different depictions may be provided because the different entities have different attribute levels (e.g., entity 504 may have an age that is greater than the age of entity 502 or vice versa).

Figure 6:
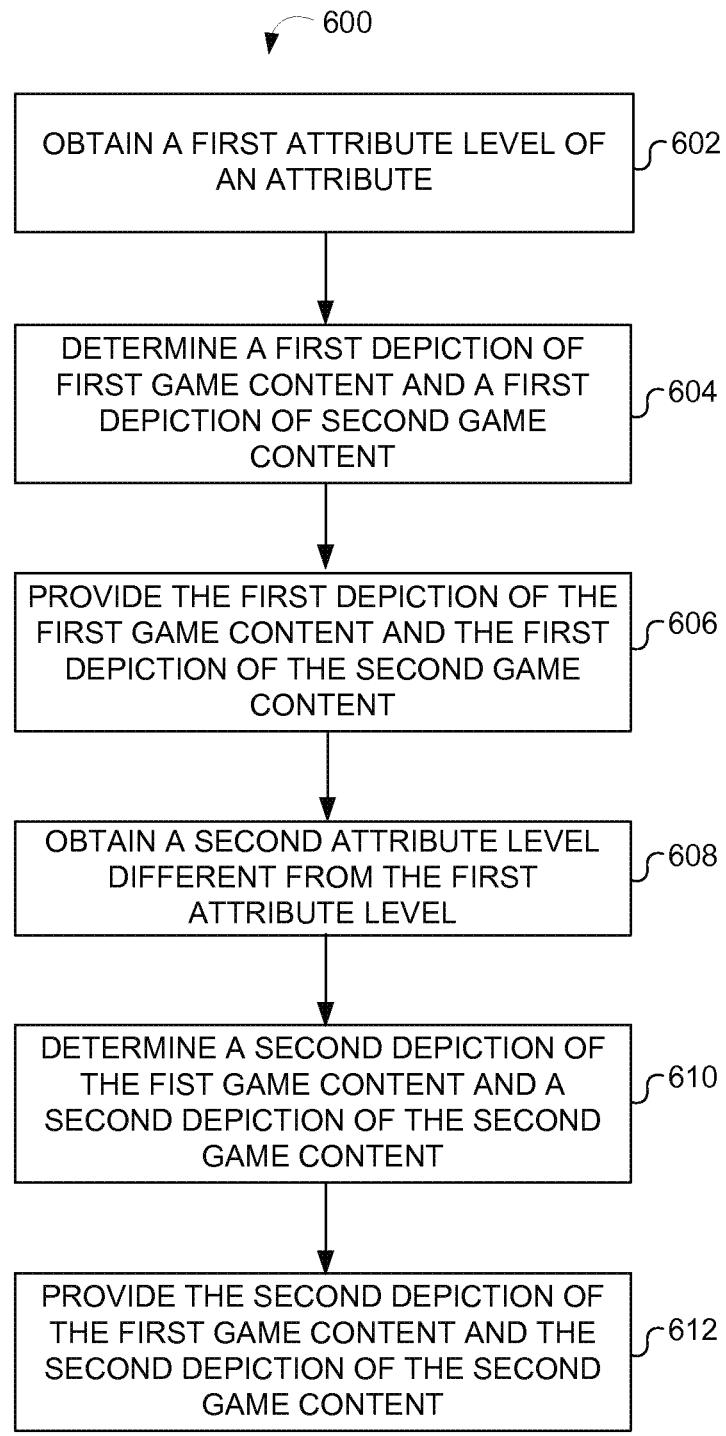
FIG. 6 illustrates a process of altering perception of game content in a virtual space, according to an embodiment of the invention.

FIG. 6 illustrates a process of altering perception of game content in a virtual space, according to an embodiment of the invention. The various processing operations and/or data flows depicted in FIG. 6 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 602, a first attribute level of an attribute may be obtained. The first attribute level may be obtained from a game module that expresses a game space, a database or memory that stores attribute levels, and/or other source of attribute level information.

In an operation 604, a first depiction of first game content and a first depiction of second game content may be determined. The first depiction of the second game content may be determined based on the first attribute level. In some embodiments, the first depiction of the first game content is independent of the first attribute level.

In an operation 606, the first depiction of the first game content and the first depiction of the second game content may be provided. For example, the first depictions may be provided to a remote device for expression at the remote device (e.g., for hosted or hybrid embodiments) and/or may be provided locally (e.g., for standalone or hybrid embodiments).

In an operation 608, a second attribute level of the attribute may be obtained. The second attribute level may be different from the first attribute level such that the level of the attribute has changed. For example, an age, skill, and/or other attribute may have changed from the first attribute level to the second attribute level. In some embodiments, the first attribute level may be associated with a first entity while the second attribute level may be associated with a second entity such that the different entities have different attribute levels for the same attribute.

In an operation 610, a second depiction of the first game content and a second depiction of the second game content may be determined. The second depiction of the second game content may be based on the second attribute level. In some embodiments, the second depiction of the first game content may be independent of the second attribute level (e.g., such that the depiction of the first game content does not change from the first depiction to the second depiction).

In an operation 612, the second depiction of the first game content and the second depiction of the second game content may be provided for expression remotely and/or locally.

Although described with respect to video games, the disclosure may be used in other contexts in which a virtual space may be expressed at a client computing platform.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system comprising:
one or more processors configured by machine-readable instructions that configure the one or more processors to:
execute an instance of a virtual game space for a video game, wherein the virtual game space includes game content for presentation to users of the virtual game space and facilitates participation by users in the virtual game space via virtual characters, such that a first user computing system associated with a first user account provides input to control a first virtual character and a second user computing system associated with a second user account provides input to control a second virtual character, and wherein first virtual game content is depicted within the instance of the virtual game space;
obtain a first attribute associated with the first user account;
obtain a second attribute associated with a user profile of the second user account, wherein the second attribute is a characteristic of a second user;
determine a first depiction of the first virtual game content for presentation to the first virtual character in the instance of the virtual game space, wherein the first depiction of the first virtual game content is based at least in part on the first attribute;
determine a second depiction of the first virtual game content for presentation to the second virtual character in the instance of the virtual game space, wherein the second depiction of the first virtual game content is based at least in part on the second attribute; and
provide the first depiction of the first virtual game content to the first user computing system and the second depiction of the first virtual game content to the second user computing system in the instance of the virtual game space, wherein the first depiction of the first virtual game content and the second depiction of the first virtual game content are different.

2. The system of claim 1, wherein the characteristic is a physical characteristic of the second user.

3. The system of claim 2, wherein the physical characteristic is an age or a gender of the second user.

4. The system of claim 2, wherein the physical characteristic is a health condition of the second user.

5. The system of claim 1, wherein the first attribute is a skill, a skill tree, a level, a faction, an alliance, a time spent logged in, or a time since character or account creation.

6. The system of claim 1, wherein the first depiction and the second depiction of the first virtual game content are at least one of a visual depiction or a mechanical depiction.

7. The system of claim 6, wherein the mechanical depiction of the first virtual game content comprises an interactable game mechanic within the virtual game space.

8. The system of claim 7, wherein the first virtual game content is configured such that there is a first interaction for the first virtual character to interact with the first virtual game content within the virtual game space and a second interaction for the second virtual character to interact with the first virtual game content within the virtual game space, wherein the first interaction and the second interaction are different types of interactions with the first virtual game content.

9. The system of claim 2, wherein the first virtual game content is a first virtual object.

10. The system of claim 9, wherein a visual depiction of the first virtual object comprises at least one of an appearance, a size, or a shape of the first virtual object within the virtual game space.

11. The system of claim 1, wherein the first depiction further comprises an audible depiction of the first virtual game content.

12. A computer-implemented method, the method being implemented in a computing system that includes one or more processors configured by machine-readable instructions, the method comprising:

executing an instance of a virtual game space for a video game, wherein the virtual game space includes game content for presentation to users of the virtual game space and facilitates participation by users in the virtual game space via virtual characters, such that a first user computing system associated with a first user account provides input to control a first virtual character and a second user computing system associated with a second user account provides input to control a second virtual character, and wherein first virtual game content is depicted within the instance of the virtual game space;

obtaining a first attribute associated with the first user account;

obtaining a second attribute associated with a user profile of the second user account, wherein the second attribute is a characteristic of a second user;

determining a first depiction of the first virtual game content for presentation to the first virtual character in the instance of the virtual game space, wherein the first depiction of the first virtual game content is based at least in part on the first attribute;

determining a second depiction of the first virtual game content for presentation to the second virtual character in the instance of the virtual game space, wherein the second depiction of the first virtual game content is based at least in part on the second attribute; and providing the first depiction of the first virtual game content to the first user computing system and the second depiction of the first virtual game content to the second user computing system in the instance of the virtual game space, wherein the first depiction of the first virtual game content and the second depiction of the first virtual game content are different.

13. The method of claim 12, wherein the characteristic is a physical characteristic of the second user.

14. The method of claim 13, wherein the physical characteristic is an age or a gender of the second user.

15. The method of claim 13, wherein the physical characteristic is a health condition of the second user.

16. The method of claim 12, wherein the first attribute is a skill, a skill tree, a level, a faction, an alliance, a time spent logged in, or a time since character or account creation.

17. The method of claim 12, wherein the first depiction and the second depiction of the first virtual game content are at least one of a visual depiction or mechanical depiction.

18. The method of claim 17, wherein the mechanical depiction of the first virtual game content comprises an interactable game mechanic within the virtual game space.

19. The method of claim 18, wherein the first virtual game content is configured such that there is a first interaction for the first virtual character to interact with the first virtual game content within the virtual game space and a second interaction for the second virtual character to interact with the first virtual game content within the virtual game space, wherein the first interaction and the second interaction are different types of interactions with the first virtual game content.

20. The method of claim 12, wherein the first virtual game content is a first virtual object.

* * * * *